(12) United States Patent
Shoulberg (10) Patent No.: US 9,135,084 B2
(45) Date of Patent: Sep. 15, 2015

(54) SERVICE PROVIDER CLASS APPLICATION SCALABILITY AND HIGH AVAILABILITY AND PROCESSING PRIORITIZATION USING A WEIGHTED LOAD DISTRIBUTOR AND THROTTLE MIDDLEWARE

(71) Applicant: Verizon Patent and Licensing Inc., Basking Ridge, NJ (US)

(72) Inventor: Richard W. Shoulberg, Guffey, CO (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 334 days.

(21) Appl. No.: 13/740,225

(22) Filed: Jan. 13, 2013

(65) Prior Publication Data
US 2014/0201750 A1  Jul. 17, 2014

(51) Int. Cl.
*G06F 9/46* (2006.01)
*G06F 9/52* (2006.01)

(52) U.S. Cl.
CPC .......... *G06F 9/526* (2013.01); *G06F 2209/522* (2013.01)

(58) Field of Classification Search
None
See application file for complete search history.

(56) References Cited

U.S. PATENT DOCUMENTS

| 2003/0236813 | A1* | 12/2003 | Abjanic | 709/102 |
| 2005/0120095 | A1* | 6/2005 | Aman et al. | 709/219 |
| 2006/0020942 | A1* | 1/2006 | Ly et al. | 718/100 |
| 2012/0060163 | A1* | 3/2012 | Khan et al. | 718/103 |
| 2012/0284383 | A1* | 11/2012 | Dudek et al. | 709/223 |
| 2013/0036149 | A1* | 2/2013 | Kosuru et al. | 709/201 |

* cited by examiner

*Primary Examiner* — Sisley Kim (57) ABSTRACT

Processing of tickets received by a ticket processing system is performed by allowing processes running on one or more hosts to access a ticket processing table to retrieve and process the tickets. A weighted load distributor (WLD) grants weighted round robin turn access to the processes running on the hosts. The WLDs running on different hosts coordinate so that a primary WLD is selected that is responsible for distributing turn access to the ticket processing table to various requesting processes. The hosts use a throttle to determine the real-time availability of resources for the hosts. The throttle determines whether a process should be allowed to proceed with processing tasks associated with a particular ticket based on resource costs associated with the required processing, as well as resources available to the respective host and ticket priority.

21 Claims, 7 Drawing Sheets

SERVICE PROVIDER CLASS APPLICATION SCALABILITY AND HIGH AVAILABILITY AND PROCESSING PRIORITIZATION USING A WEIGHTED LOAD DISTRIBUTOR AND THROTTLE MIDDLEWARE

BACKGROUND

A Service Provider Class Application is a software system that runs on large computers and delivers a "mission critical" service or a constituent piece of a critical service to customers (e.g., large corporations and/or governments). It is often desirable for the application to always be available "seven-by-twenty-four," even during application maintenance, or catastrophic events such as a Wide Area Network (WAN) partial outage, an individual computer system failure, or a regionally restricted natural disaster, like a hurricane. In certain instances, service provider class applications are so large that even computers having a relatively large amount of dedicated resources do not have the ability to process the application. As such, there exists a need for providing scalability to allow 1) the application to scale beyond the constraints of a single computer (e.g., to use multiple computers), while providing 2) high availability of the application so that the application continues to run in the event network paths or individual computers fail, or are been taken offline, and 3) provide an application processing prioritization mechanism in the event of an unusually high processing load (such as during a man-made or natural disaster).

Hence, a need exists for software routines that can be used to provide scalability, high availability and processing prioritization to systems supporting service provider class applications.

BRIEF DESCRIPTION OF THE DRAWINGS

The drawing figures depict one or more implementations in accord with the present teachings, by way of example only, not by way of limitation. In the figures, like reference numerals refer to the same or similar elements. In the figures.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Aspects of the subject technology provide middeware used to provide scalability, high availability and processing prioritization to systems supporting service provider class applications. As used herein "middleware" can refer to a set of software routines designed to solve a problem common to multiple applications. In some implementations, one or more applications can be designed to have generic interfaces so that the middleware can be reused (recycled) by many applications, instead of being specific to one application and thus not readily reusable by other applications. As described in further detail below, aspects of the subject technology provide middleware including a weighted load distributor (WLD) and throttle to provide multiple service provider class applications with increased scalability and high-availability. As used herein "WLD" and "throttle" refer to separate processes, each of which can have multiple instances that are executed on one or more computers (e.g., hosts or servers). In certain aspects, multiple WLD processes and/or multiple throttle processes may be simultaneously executed on various hosts and/or servers in a ticket processing system, as described below.

In some implementations, a global telecommunications company is considered to be a service provider that provides telecommunications services (products) to corporations and governments. Thus, software applications that support or include part of the global telecommunications company's products are considered to be "service provider class applications."

Services (products) provided by a global telecommunications company can include a trouble ticket management system. In certain implementations, a trouble ticket management system can facilitate the tracking and resolution of errors in a communication network and/or customer complaints, for example, using automatic processing. Trouble ticket management systems can also be used to receive and process tickets generated by other computer systems. An example of a trouble ticket management system configured to receive and process trouble tickets includes the Enterprise Trouble Management System (ETMS).

An ETMS system is the owner of its trouble "tickets" (e.g., records associated with one or more errors in a communication network), and can determine how to route a ticket to another service provider class application. In certain implementations, the destination service provider class application is an Integrated Test System (ITS). Once a trouble ticket has been received from ETMS, the ITS can process the ticket in a series of steps. Processing steps performed by the ITS can include actually testing a live WAN customer circuit originating from a telecommunications company customer site, for example, via one or more network elements (NE's) owned and operated by the telecommunications company. In such implementations, the ITS can communicate with the NEs (or other customer site equipment) in order to test or resolve the customer issue. The goal of the ITS is to resolve the issue corresponding with the ticket, and to place the ticket in condition to be sent back to the ETMS, which can then resume ownership of the ticket.

In certain aspects, ITS processing involves temporarily placing a ticket in an ITS database table, for example, that is only visible to the ITS application. As ITS processes the ticket, ITS places the ticket in several states that advance the ticket along the processing path or algorithm. In some aspects, an ITS software system can consist of dozens of ticket processing processes, each particular process being dedicated to processing tickets in a particular state. In other words, each ITS state of a particular ticket, as indicated by a corresponding state attribute, puts that ticket in a state of availability for processing by a particular type of ITS process.

Since an ITS system is a service provider class application capable of performing complex processing tasks (e.g., for processing trouble tickets), it can benefit from utilization of a WLD and throttle, according to certain aspects of the subject technology. In contrast, other processes that may be configured to carry out less intensive processing operations (e.g., to receive and store a ticket in a table for later processing), may not benefit from use of the WLD and/or throttle. Thus, because of the relative simplicity of some processes of the ticket processing system, not all processes require use of the WLD and/or throttle, as described herein.

In some implementations, one instance of each type of ITS process can be replicated (cloned) on each of several physical computers (e.g. "hosts"), located in multiple geographical locations or data-centers. The WLD and Throttle Middleware can allow each cloned instance of a particular type of ITS process to run simultaneously at multiple geographic locations, thus providing enhanced scalability, while also ensuring that only one ITS instance consumes a ticket in the state corresponding with the ITS process of that type. As described in further detail below, the self-healing characteristics of the WLD and throttle help to ensure that the processing of any given ticket can proceed. Also, use of the WLD allows the processing of the ticket to "float" amongst a "bank" of geographically distributed computers, so no particular computer "owns" the ticket, thus in the event of an outage the remaining ITS processes will continue the processing of tickets in the table, through use of the WLD middleware, which intelligently communicates in "near-real-time" to one instance of the WLD process running on each computer, each connected in a mesh of TCP/IP sockets. As used herein, the terms "WLD process," "WLD middleware," and "WLD server" all refer to a WLD software process that is executed on a physical computer, such as a host computer.

In certain aspects, ITS can use throttle middleware to ensure that a process of a particular type (i.e., a process that is about to consume a ticket) has adequate resources before actually consuming the ticket (e.g., a ticket available to that ITS process type). Additionally, the ITS can use the throttle to prioritize ticket consumption. For example, different tickets can be associated with different priority levels. Although prioritization of tickets may be based on a variety of criteria, prioritization can be specifically based on a type of customer associated with a ticket (e.g., a preferred customer), a geographic area from which the ticket originated, or an error type associated with the ticket (e.g., a high-priority or emergency type error), etc. In some implementations, the throttle can consider both the priority associated with a ticket, as well as the availability of resources to the host running the process (or processes) that are responsible for processing the ticket. For example, for a host with limited resources (e.g., limited processing capabilities or memory, etc.), the throttle can ensure that the ITS will only consume tickets of a relatively high priority class. As such, the throttle can be used to shift limited host resources to high priority tickets, such as tickets associated with select customers.

In some implementations, the disclosed subject matter provides a method for coordinating and distributing processing tasks for data records (e.g., tickets) through the use of the WLD. Although this disclosure includes examples of tickets or "trouble tickets" that relate to errors or issues in a communication network, the terms "ticket" and "record" are not so limited and may refer to any computing task(s) or job(s) for which processing can be performed.

As is explained in further detail below, tickets can correspond with tasks or processing jobs specifically relating to a communication network, such as, tasks associated with one or more errors or malfunctions in the communication network. Although tickets may originate and pertain to various portions of the communication network, in some aspects tickets will be received with respect to issues for one or more of: a private line, a dedicated Internet access line, or a private Internet access line. In certain aspects, tickets may include various types of information identifying the point of origin or subject technical failure. By way of example, a ticket may include information identifying a circuit (e.g., a "circuit ID") and/or information identifying a product, customer and/or purchaser associated with the circuit for which the ticket was generated. In many instances, the error issue responsible for the generation of a trouble ticket will be unknown, hence the need for performing processing on the ticket in order to identify and/or rectify the original cause.

Tickets can be received by a ticket processing system of the subject technology via an Enterprise Trouble Management System (ETMS) and stored in a ticket processing table. The ticket processing system of the subject technology can include multiple computing systems (e.g., hosts) on which different software processes and/or multiple instances of the same software process can be executed. Processing of tickets is performed by allowing processes (variously running on one or more hosts) to access the ticket processing table to retrieve and process tickets. To avoid the problem of collision between two or more processes that attempt to retrieve/process the same ticket in the state of being ready for those processes, the subject technology implements a weighted load distributor (WLD) for granting weighted round-robin turn access to multiple cloned instances of the same process types, for example, that are simultaneously running on the two or more hosts. That is, a WLD can be used to grant a turn to a process to access the table in order to consume a ticket (e.g., a record from the table) for processing.

Although a ticket processing system of the subject technology can include a single instance of a WLD, for example, running on a single host; in many implementations, at least one instance of a WLD will be provided on each of multiple hosts in the ticket processing system. As described below, instances of the WLD running on different hosts can communicate with one another, and can coordinate a "primary" or "king" WLD responsible for distributing access to the ticket processing table on a (weighted) turn-by-turn basis.

Additionally, in some implementations of the technology, two or more hosts in the ticket processing system can utilize a throttle process (e.g., a "throttle") for determining the real-time availability of resources for the respective host. For example, a throttle can make determinations as to whether a process should be allowed to proceed with processing tasks associated with a particular ticket, based on resource costs associated with the required processing, as well as resources available to the respective host system, including, for example, processor resources, available memory and/or bandwidth, etc. In some implementations, the throttle may grant permission to a particular process based on a measure of ticket priority. By implementing the throttle with the WLD, a determination can be made (at each host) as to whether a given ticket should be processed at that particular host. Implementations of a WLD as disclosed herein can result in vast improvements to the overall availability and scalability network systems configured to perform distributed processing tasks.

Figure 1A:
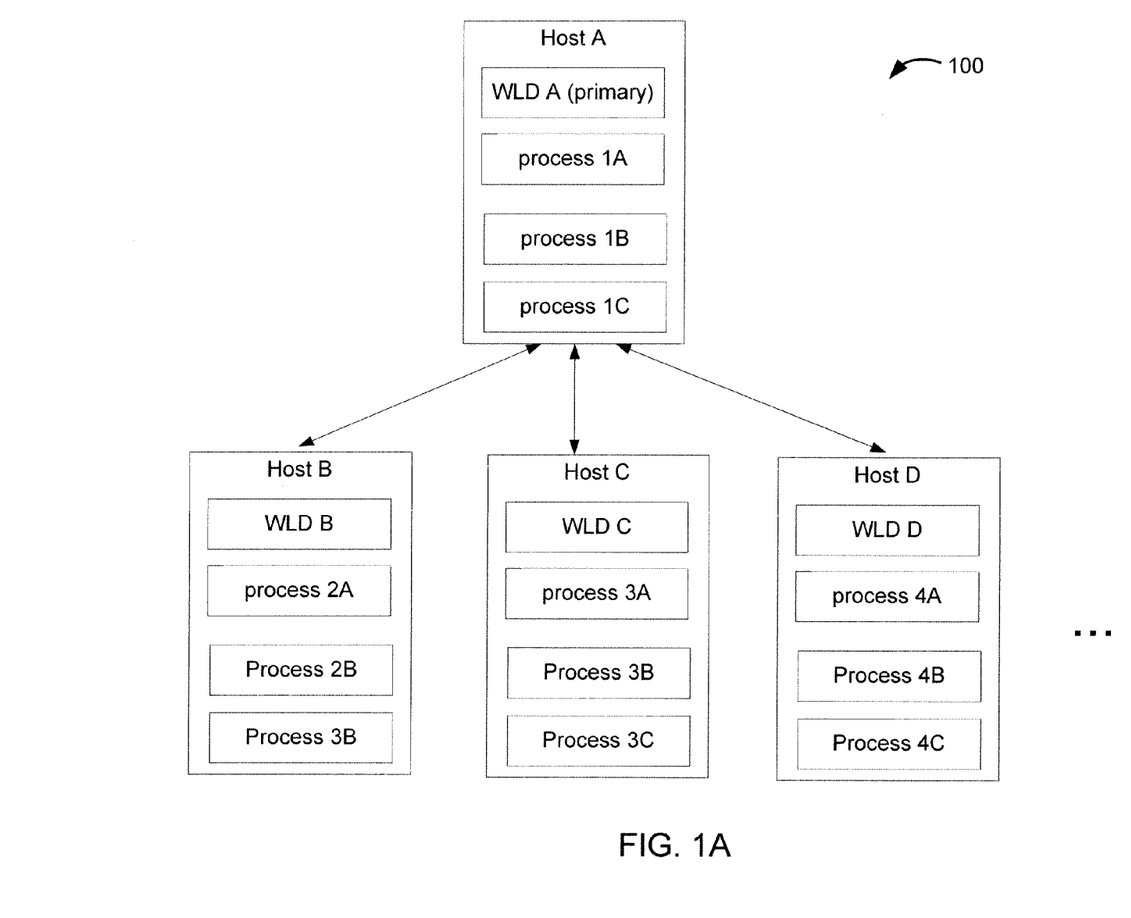
FIG. 1A illustrates an example of a functional block diagram of a system including multiple instances of a weighted load distributor module, according to certain aspects of the subject technology.

FIG. 1A illustrates an example of a functional block diagram of a system 100 including multiple instances of a weighted load distributor, according to certain aspects of the subject technology. As illustrated, system 100 includes multiple hosts (e.g., Host A, Host B, Host C and Host D). Further, each of the multiple hosts includes a running instance of a WLD (e.g., WLD A, WLD B, WLD C or WLD D, respectively). As explained in further detail below, in certain aspects each instance of the WLD may be identical (e.g., being functionally similar and having access to the same configuration data), however a single instance may be designated as a "primary" or "king" and granted control over the other remaining instances of the WLD.

Each host of system 100 is shown to be executing/running three processes, for example, Host A includes process 1A, process 1B and process 1C. Host B includes process 2A, process 2B and process 2C. Host C includes process 3A, process 3B and process 3C. Finally, Host D includes process 4A, process 4B and process 4C. It should be understood that the number of processes running on each host is not limited to those illustrated in the example of FIG. 1A, and depending on implementation a greater or lesser number of processes may be executed on any of the illustrated hosts, and the number of processes running on each host may be independent of that running on any other host. Similarly, system 100 is not limited to four hosts, and may contain a greater or lesser number of hosts.

Figure 1B:
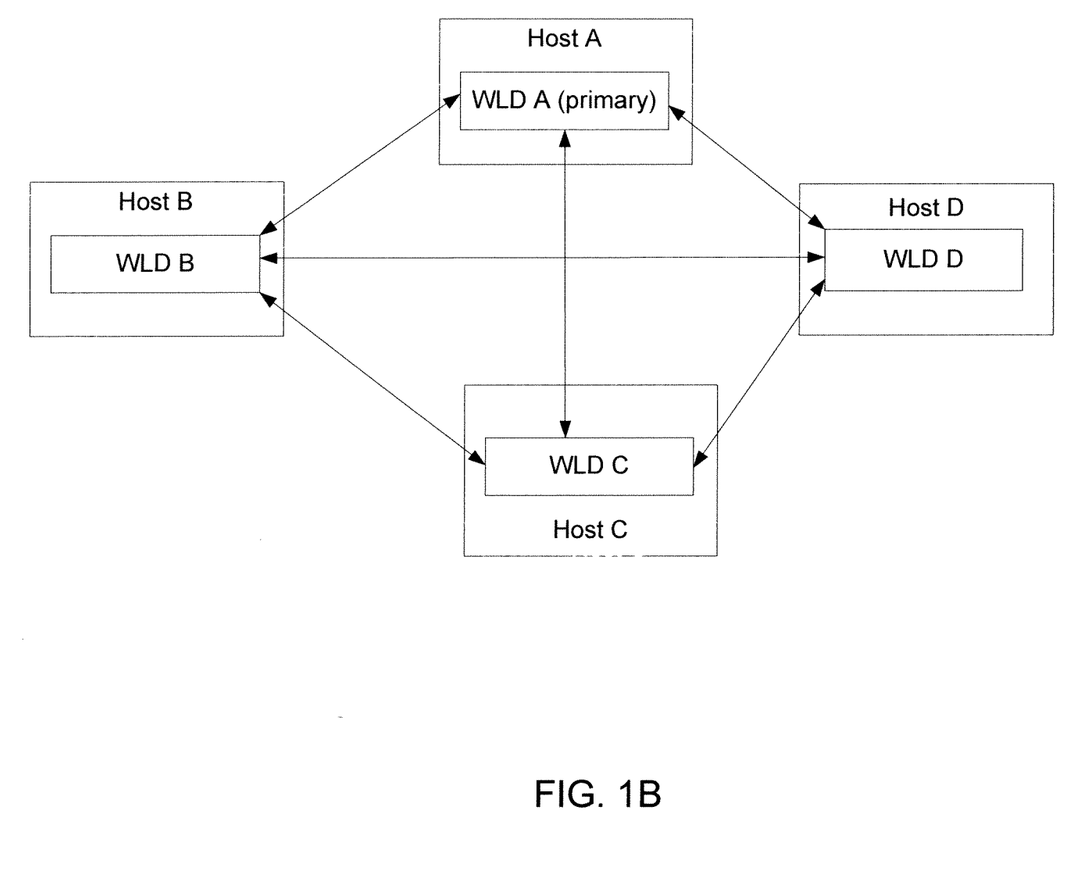
FIG. 1B illustrates an example of multiple weighted load distributors (WLDs), running on different hosts, according to certain aspects of the subject technology.

In certain aspects, each of WLD A, WLD B, WLD C, and WLD D may be in communication with one another, and may have access to configuration information detailing relative resources available to each host device (e.g., Host A-Host D). FIG. 1B illustrates an example of communication between WLDs residing on different hosts. For example, WLD A, WLD B, WLD C, and WLD D, residing on Host A, Host B, Host C and Host D, respectively. In certain implementations, one of the multiple WLD processes is designated as a "primary" or "king," for example, based the longest running "up" time. In the example of FIG. 1B, WLD A is designated as the primary WLD; however, if WLD A were to go down, for example, because Host A were to crash (or be taken offline), one of the remaining WLDs (e.g., WLD B, WLD C, or WLD D) would be designated as the new primary WLD.

The WLD designated as the primary (or king) can be made responsible for coordinating the distribution of turn access to two or more requesting processes received via one or more other WLDs operated in a secondary role. In the event of a computer outage, such as a WAN outage or other catastrophe, which may take out the primary (king) WLD process, the remaining WLD processes can recognize the loss of the primary WLD and can automatically renegotiate a new primary WLD, thus eliminating the need for human intervention and increasing application uptime.

As illustrated in system 100 of FIG. 1A, Host A is associated with WLD A, which is designated as "primary." When designated as primary, WLD A can receive forwarded table-access requests from other WLDs (e.g., any of WLD B, WLD C and/or WLD D) that have been made by any of the running processes. By way of example, process 3B on Host B may request turn access to a ticket table by issuing a request to WLD B. Because WLD B is secondary to WLD A (king process), the request is forwarded to WLD A, which makes a determination of turn access.

In certain aspects, a process will call the WLD, via an application programming interface (API), as will be described in further detail below. In order to synchronize load distribution, each process will call a function called "acquireWLDLock" to acquire a "lock" from the WLD for a specific process type (e.g., "typeProcess"). Because, only one lock per process type will be given out by the WLD, only the process that has acquired the WLD lock will have the ability to process a ticket for that process type. For example, acquireLock can block a calling process until the lock is available for the typeProcess. After processing is completed, a corresponding function called "releaseWLDLock" is called, to return the lock to the WLD.

In certain aspects, processes on the same host (with different processes performing different functions, e.g., having a different "typeProcess"), can concurrently call acquireLock and releaseLock in a multithreaded or multi-tasking fashion. In this manner, parallel processing of different process types can occur on the host. In certain aspects, typeProcess includes a unique string of characters identifying a process type for a process wanting to use the WLD. In some implementations, the acquireLock function may fail (returning a false condition), if the local WLD process has not started. In such cases, the process may log and report errors.

After successfully acquiring a lock (e.g., after a successful acquireLock), the calling process can use the lock to consume the next available resource (for example a row from a table with a state attribute indicating availability for consumption by typeProcess). If the process is of a type that elects to use throttling, while inputting the parameters for the next row to be consumed, the process will call a throttle API function (e.g., "thresholdExceeded"), for use in interfacing with a throttle. For example, the throttle may allow (or disallow) the process to consume a ticket based on a determination of whether enough resources are currently available to perform processing of the associated type. This determination may be made by identifying, for example, if a threshold has been exceeded. As will be discussed in further detail below, thresholds for different criteria (e.g., customer priority, ticket task size, available host resources), can be set in a throttle configuration file (e.g., throttle.config) that is used by the throttle to determine whether to allow the calling process to proceed with consumption of a ticket.

By way of example, if a threshold is exceeded for the first available ticket (such as a table row with an item available for the corresponding typeProcess), then the process can move to the next ticket (e.g., a next row), and can call the thresholdExceeded function. This process can continue until just one row is available for consumption and/or no additional entities are available. When the process finds a consumable ticket (for example table row), the process will mark the consumed ticket, for example, by changing the row's associated state attribute and calling releaseLock. Subsequently, processing of the ticket can be finished.

For processes that combine throttling with WLD, if none of the available tickets pass the thresholdExceed function call, then the associated typeProcess is overloaded at the threshold levels for the available tickets. Accordingly, processes of the corresponding typeProcess cannot process any of the available tickets. As a result, the processes of the associated typeProcess will call releaseLock, so that other processes can consume the remaining tickets. Similarly, if there are not enough tickets of a particular type to be consumed, then the processes of the corresponding typeProcess can call releaseLock.

When a process requests distribution by calling the acquireLock function, the local WLD middleware forwards the request to the primary WLD and waits for the primary WLD to respond. The local WLD then returns from the acquireLock after the primary WLD responds. The local WLD process then communicates to other remote WLD's (e.g., via sockets) to find the current primary WLD (as determined by age) that controls the actual distribution. All secondary WLD's are provided an indication of the order of succession among the WLD's if the primary WLD is interrupted.

In the rare event of 2 primary WLDs (firewall or network down), after communications are reestablished, the oldest WLD reclaims the status as the "king" If a local WLD process cannot contact the other WLD processes, it will continue to operate on its own (and promote itself to primary if necessary), since the other hosts are down, or the network is down. The primary WLD independently tracks each typeProcess request, for example, from processes such as a "javaProxy," a "tktMonEvent," a "TktRec," a "TktPre," a "TktInit," a "TktPost," etc. For each process type, the primary WLD has a distribution matrix of host:port vs. weightLevel (e.g., with weights 1-10), and current pointer. In some aspects, the WLD configuration does not contain information related to different process types (e.g., typeProcess). Instead, the first time a request for a particular typeProcess is received by the primary WLD, the king WLD builds a matrix and tracks that type. During application software installation, operations leave the local WLD process running in case it is the primary WLD, but if they accidently kill the primary WLD then another WLD will be designated as a primary.

In certain aspects, the WLD configuration files (e.g., for all running instances of WLD) are updated each time a host is added (or removed) from system 100. The WLD configuration file can be loaded into each WLD of the various hosts, either manually or automatically. The automatic operation may require a script that will automatically propagate the WLD configuration file to all the WLD processes. To utilize the new configuration file, the WLD process may be bounced (killed and restarted). In some implementations, a monitoring script may be implemented on each host that is configured to monitor whether or not the WLD is running, and if not, the monitoring script can restart the WLD. Upon starting, (or restarting) a WLD process, the latest WLD configuration file will be propagated to the newly running WLD; thus, all WLD instances will contain the latest version of the WLD configuration file.

As described in further detail below, each process that can make use of the WLD can have a WLD API, which, in effect, functions as a client to the WLD load distributor, and provides a means by which the process can access the functionality of the WLD.

Although the grant of turn access (e.g., access to the table by different processes running on Host A-Host D) can be made in a serial round-robin fashion as the requests are received, in certain implementations, the WLD will grant turn access using a weighted round robin procedure. By way of example, each host may be associated with a value or "weight" corresponding with an amount of dedicated resources available to the respective host at the time of the request (e.g., as contained in the WLD configuration file, described above). A WLD, such as WLD A, can then make a determination as to how often to grant access to a particular process on a particular host, based on the associated weight. For example, a host having a greater weight may be granted access to a ticket table more often than a host with a relatively lower weight. Although the grant of turn access made by the WLD can be based on a respective weight associated with a particular host, in certain aspects, the WLD will not receive information regarding the type of process that is requesting access, or the processing tasks associated with the corresponding ticket. That is, the WLD will have access to information associating a measured of dedicated computing resources with each host (e.g., a WLD configuration filed); however, in certain implementations, the WLD configuration file will not contain information related to the type of requesting process, or associated processing tasks for the corresponding ticket.

In some aspects, information regarding associations of each host with a particular weight (e.g., a weight designating a size or amount of dedicated resources available to the respective host) is contained in a configuration file available to each host. By way of example, each of multiple instances of the WLD running on each of multiple respective hosts possesses an identical configuration file indicating a list of all other hosts and their corresponding weights. Thus, each one of multiple WLDs possesses information indicating what other hosts are available in the ticket processing system, as well as an indication of the dedicated resources available to each of the other hosts.

Figure 2:
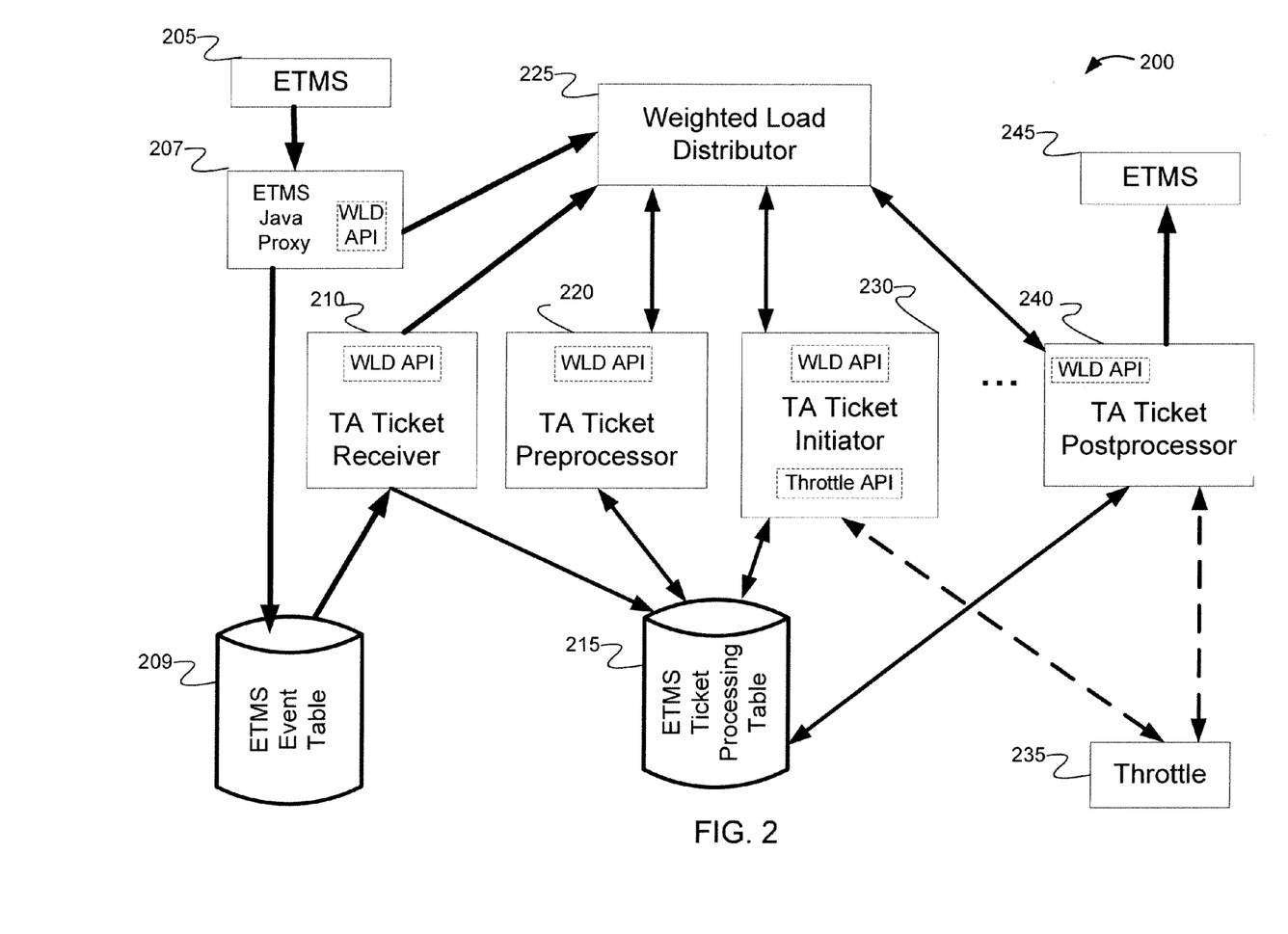
FIG. 2 illustrates an example of a functional block diagram of software modules for receiving and processing tickets received from a communication network, according to certain aspects of the subject technology.

FIG. 2 is a high-level functional block diagram of various processes for implementing a ticket processing system, according to some aspects of the subject technology. As illustrated in FIG. 2, ticket processing system 200 can include software processes that are executed on two or more computing devices, such as Host A-Host D as described above with respect to FIGS. 1A and 1B. Although each of the software processes illustrated in FIG. 2 are shown as having a single instance, depending on implementation, one or more of the various processes may be executed on a single host, or on multiple hosts. The software processes in ticket processing system 200 include Enterprise Trouble Management System (ETMS) 205, TA Ticket Receiver 210, TA Ticket Preprocessor 220, Weighted Load Distributor (WLD) 225, TA Ticket Initiator 230, Throttle 235, TA Ticket Postprocessor 240, and ETMS 245. Furthermore, TA Ticket Receiver 210, TA Ticket Preprocessor 220 and TA Ticket Initiator 230 each include a WLD application programming interface (e.g., WLD API), for use in interfacing a WLD process of the subject technology. Also TA Ticket Initiator 230 and TA Ticket Postprocessor 240 each include a throttle API, for interfacing with a throttle, as will be described in further detail below. As illustrated, ticket processing system 200 further includes ETMS Ticket Processing Table 215, for facilitating storage of tickets.

The ticket processing system 200 illustrates an example of software processes that may be running on ticket processing system 200. However, a greater number, or fewer number of processes may be executed. Additionally, depending on implementation one or more instances of a particular process may be executed on ticket processing system 200.

In some implementations, ticket processing system 200 receives a ticket at ETMS 205, for example, from a communication network. The received ticket can be passed from ETMS 205 to TA Ticket Receiver 210, which then stores the ticket into ETMS Ticket Processing Table 215.

In certain aspects, one or more intermediary processing steps may be performed before a ticket is passed to TA Ticket Receiver 210. For example, the received ticket may require reformatting using additional systems or processes, such as ETMS Java Proxy 207, and may be stored to one or more intermediary tables, such as ETMS Event Table 209. Once the received ticket has been properly formatted for storage to ETMS Ticket Processing Table 215 (e.g., by setting a proper state attribute indicating that the ticket is ready to be consumed by a ticket receiver process), the received ticket is passed to TA Ticket Receiver 210 from ETMS Event Table 209. In certain aspects, multiple instances of Ticket Receiver 210 may be running, as such, before accessing ETMS Java Proxy 207, Ticket Receiver 210 must be granted turn access by WLD 225, in order to retrieve a ticket from ETMS Event Table 209.

After TA Ticket Receiver 210 retrieves the ticket from ETMS Event Table 209, TA Ticket Receiver 210 stores the ticket into ETMS Ticket Processing Table 215, where it is available to be retrieved for processing by two or more process running on two or more hosts, as discussed above. The grant of turn access by each process that accesses a ticket in ETMS Ticket Processing Table 215 is governed by WLD 225. By first requiring the grant of turn access by WLD 225, the orderly processing of tickets in ETMS Ticket Processing Table 215 can be performed. That is, WLD 225 ensures that two or more different processes (e.g., two instances of the same process), do not attempt to access the same ticket simultaneously. However in some implementations, different processes may access different tickets simultaneously. By ensuring that processes of a similar type cannot access/process a common ticket (e.g., perform processing on tasks associated with a common ticket), each of the various processes can be allowed to perform processing on tickets of a various task type.

By way of example, TA Ticket Preprocessor 220 may request turn access from WLD 225, in order to access ETMS Ticket Processing Table 215 to retrieve the ticket, or edit information associated with the ticket. In certain aspects, if access is granted to TA Ticket Preprocessor 220 by WLD 225, then TA Ticket Preprocessor 220 can access a ticket in ETMS Ticket Processing Table 215. In certain implementations, if WLD 225 is not the primary WLD, then WLD 225 will forward the request to the primary WLD, residing on a different host. Subsequently, the WLD 225 will wait ("block") for a socket (e.g., a TCP/IP socket) to be granted a turn for TA Ticket Preprocessor 220. In certain implementations, the forwarding between WLD 225 and the primary WLD is transparent and occurs unbeknownst to TA Ticket Preprocessor 220. Once a given ticket is accessed by a process (e.g., TA Ticket Preprocessor 220), the given ticket is inaccessible to other processes of ticket processing system 200.

In certain implementations, TA Ticket Preprocessor 220 can access a given ticket and can make a determination as to the processing tasks that need to be performed with respect to the ticket. Based on this determination, TA Ticket Preprocessor 220 can associate the given ticket with a task type (e.g., a "state attribute"). The state attribute for a particular ticket can include various types of information, which may include information regarding the current state of the ticket, and/or information regarding future processing tasks to be performed with respect to the ticket.

Once TA Ticket Preprocessor 220 has associated the given ticket with a state attribute, ETMS Ticket Processing Table 215 is updated to include the associated state attribute. For example, state attribute information is stored to a column associated with the row in ETMS Ticket Processing Table 215 that holds the ticket. After TA Ticket Preprocessor 220 has completed its operations with respected to the given ticket, control over the given ticket is relinquished, thereby allowing other processes to access the same ticket in ETMS Ticket Processing Table 215 for further processing. For example, TA Ticket Initiator 230 can then request turn access to ETMS Ticket Processing Table 215 from WLD 225. Because the grant of access to ETMS Ticket Processing Table 215 is coordinated by WLD 225, TA Ticket Initiator 230 can perform processing related to multiple different processing tasks on any ticket that is selected in ETMS Ticket Processing Table 215.

In one example, TA Ticket Initiator 230 can select the ticket, discussed above, and perform processing on the ticket commensurate with the ticket's current state attribute (e.g., based on the state attribute provided by TA Ticket Preprocessor 220). After TA Ticket Initiator 230 has processed the ticket, the ticket's state attribute can be updated in ETMS Ticket Processing Table 215, and the ticket then becomes available for further processing e.g., by a different process.

In another example, TA Ticket Initiator 230 may select a new ticket, and may perform a set of processing steps based on a different state attribute associated with the different ticket. In some implementations, the processing performed by TA Ticket Initiator 230 (or by other processes in ticket processing system 200), may be different as between two different tickets associated with different state attributes in ETMS Ticket Processing Table 215. By depending on WLD 225 to provide turn access to ETMS Ticket Processing Table 215, a single instance of a process can be used to perform different processing types on different tickets, without the possibility of erroneously accessing a ticket that is concurrently being processed and/or accessed by a different process.

In certain aspects, before processing is performed by a process on a ticket in ETMS Ticket Processing Table 215, the process must be granted permission by Throttle 235, which can determine, based on a variety of criteria, whether a particular process should be granted access to a given ticket. In certain aspects, Throttle 235 can access a throttle configuration file containing information about the host on which that instance of the throttle is running. That is, each throttle (running in each of a respective plurality of hosts) will have access to its own throttle configuration file, containing information about the dedicated computing resources available to that respective host.

Although the throttle configuration can be stored in a variety of formats, in certain aspects the throttle configuration will include a throttle configuration file (e.g., a "throttle.config" text file) that allows the configuration of multiple priority levels and thresholds for different types of processes. In some implementations, when a process calls the "thresholdExceeded" API function, a copy of throttle.config is loaded into memory. In certain aspects, each row in the throttle.config file contains multiple "name=value" pairs and "name=identifier=value" triplets separated by commas. For example, the "names" may include one or more of "T," "P," "PID," "% SWPOCC," or "% RUNOCC." In some aspects, pairs with name "T" are the ProcessType's passed to the thresholdExceeded function, and are the same process names seen in the operating system, for example by using a "top" command. In certain implementations, triplets with name "P" correspond with parameters in the same order as those that get passed to the thresholdExceeded function.

In one example implementation, if TA Ticket Initiator 230 selects a first ticket in ETMS Ticket Processing Table 215, and requests permission from Throttle 235 to process the first ticket. Throttle 235 can then determine whether TA Ticket Initiator 230 can proceed, based on the state attribute and/or task type associated with the first process. The determination can also be based on the real-time resources available to the particular host that is running TA Ticket Initiator 230. Although Throttle 235 can be configured to make this determination based on a variety of factors, in certain aspects, Throttle 235 can allow or deny process access based on the current availability of dedicated system resources (e.g., the availability of processing cycles and/or memory resources). Additionally, Throttle 235 can allow or deny process access based on the resource cost associated with processing tasks for a given ticket (e.g., with respect to the "size" of the associate computing task). The availability of system resources can be dependent on, but is not limited to, the availability of computational resources such as information processing capabilities (e.g., processing power), bandwidth, percent run queue occupied, count of currently running processes of a certain time (e.g., by name), percent CPU idle and/or memory resources that are available to a process e.g., on the local host supporting the process.

In certain implementations, after processing by TA Ticket Initiator has been completed, the ticket is retrieved by TA Ticket Postprocessor 240, upon grant of turn access by WLD 225. Subsequently, the ticket is provided to ETMS 245, before being sent back to the communication network (not shown).

Figure 3:
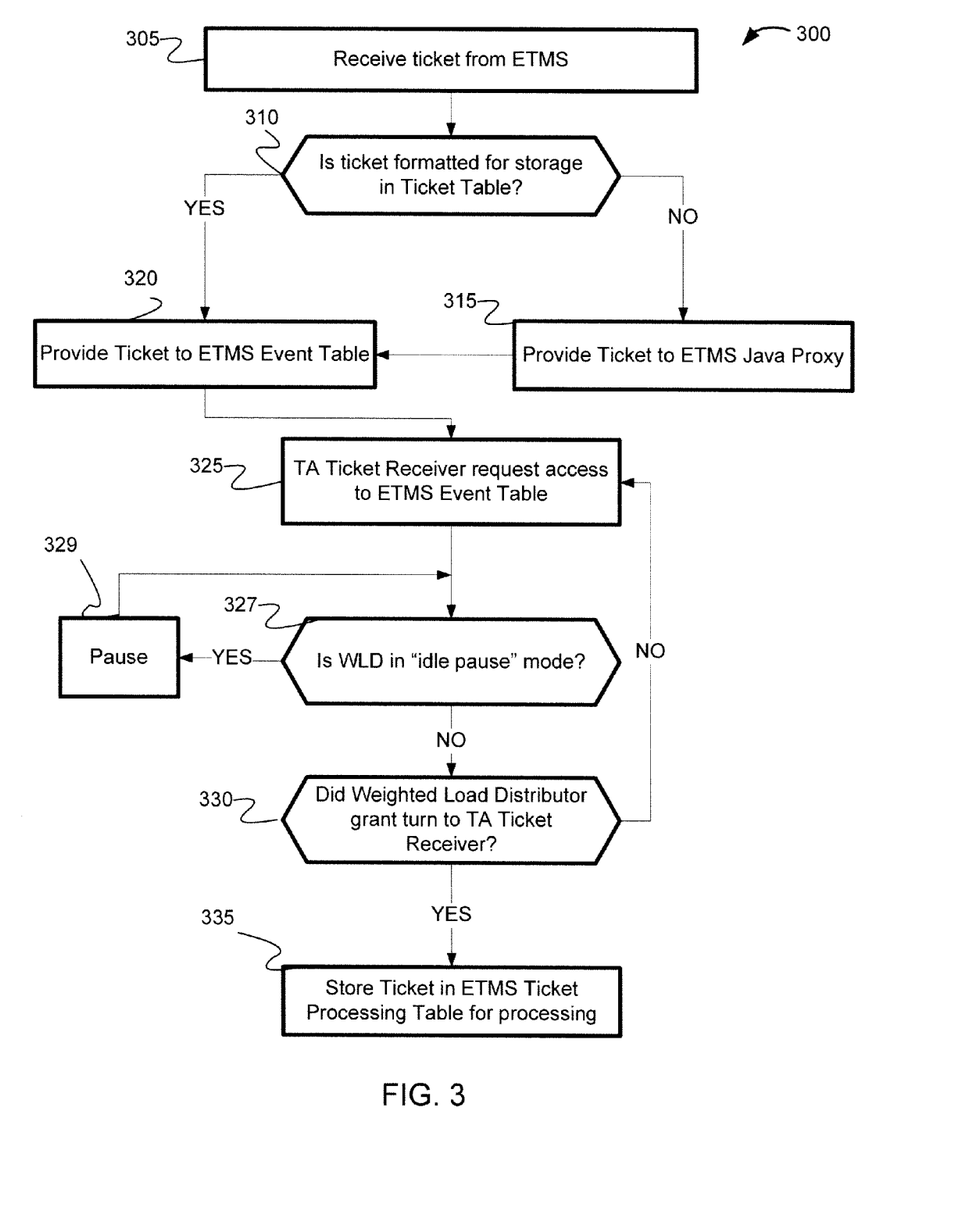
FIG. 3 is a flow diagram of a process for receiving and storing a ticket to a table for processing, according to some aspects of the subject technology.

FIG. 3 is a flow diagram of a process 300 for receiving and storing a ticket to a table for processing, according to some aspects of the subject technology. Process 300 begins with step 305 in which a ticket from a communication network is received from an ETMS (e.g., ETMS 205, discussed above). In step 310, it is determined if the ticket is formatted for storage in a ticket table (e.g., ETMS Ticket Processing Table 215). If it is determined that the ticket is not properly formatted for the ticket table, the process can proceed to step 315, in which the ticket is subjected to intermediary processing to prepare the ticket for storage in the ticket table. By way of example, an improperly formatted ticket can be provided to ETMS Java Proxy for reformatting. After reformatting, the process proceeds to step 320 in which the ticket is stored to an ETMS Event table, for example by the ETMS Java Proxy.

Alternatively, if it is determined that the ticket is properly formatted for the ticket table, the process proceeds directly to step 320, wherein the ticket is stored to the ETMS Event Table. Subsequently, in step 325, the TA Ticket Receiver requests access to the ETMS Event Table. However, before TA Ticket Receiver can be granted access to the ETMS Event Table, it is first determined whether the WLD is in an "idle pause" state. Thus, in step 327, it is determined whether the WLD is currently in an "idle pause" state. As described in further detail below, the WLD may be placed in an idle pause mode in response to one or more processes becoming overloaded. If it is determined that the WLD is in an idle pause mode, the process will proceed to step 329 in which the WLD waits for a predetermined time period, for example, between 3 and 10 seconds, before resuming operation. After the pause period is over, and/or if it is determined that the WLD is not in an idle pause mode, the process proceeds to step 330, in which it is determined if the WLD granted a turn to the TA Ticket Receiver. In certain aspects, the determination of whether to allow access to the ETMS Event Table is grated by a WLD, as described above. If access is not granted to the TA Ticket Receiver, the process reverts back to step 325.

Alternatively, if the WLD grants access to the TA Ticket Receiver, the process proceeds to step 335 in which the TA Ticket Receiver accesses the ETMS Event Table to retrieve a ticket for storage in the ETMS Ticket Processing Table. In certain aspects, the TA Ticket Receiver can update a state attribute associated with the ticket in the ETMS Ticket Processing Table. The state attribute can contain information indicating the current state of the ticket, such as, a progress status of the ticket as it advances through the ticket processing system.

Once a ticket has been stored to the ETMS Ticket Processing Table, the ticket is available for processing by two or more processes of the same type running on two or more hosts. In certain aspects, a ticket may be indicated as available to two or more processes by setting a state attribute in a column of the row corresponding to the ticket (e.g., a state attribute that indicates the availability of the ticket to a process of the associated type). An example of steps for processing a ticket using two or more processes is illustrated with respect to FIG. 4.

Figure 4:
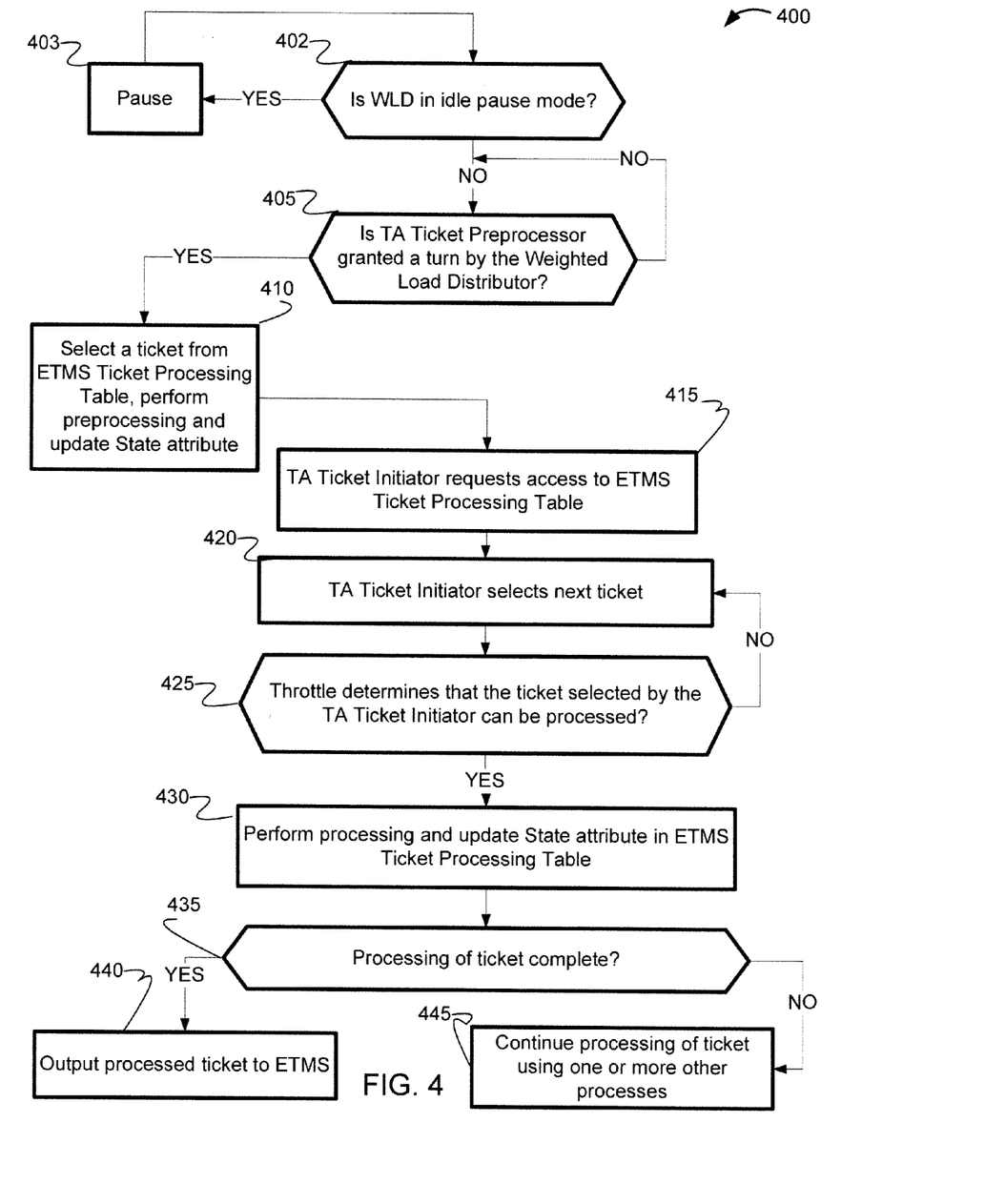
FIG. 4 is a flow diagram of an example process for processing tickets based on turns granted by a weighted load distributor, according to some aspects of the subject technology.

Specifically, FIG. 4 illustrates a flow diagram of an example process 400 for processing tickets based on turns granted by a weighted load distributor (WLD), according to certain aspects of the technology. Process 400 begins with step 402 in which it is again considered whether the WLD is in an idle pause mode. If the WLD is in an idle pause mode, the process will proceed to step 403, in which the WLD will wait for a predetermined pause period. However, if the WLD is not in an idle pause mode, the process will proceed to step 405, in which it is determined whether a TA Ticket Preprocessor process is granted a turn by the WLD. If no access is granted to the TA Ticket Preprocessor, process 400 reverts back to step 405. Alternatively, if a turn is granted to the TA Ticket Preprocessor, process 400 continues to step 410. In step 410, TA Ticket Preprocessor is allowed access to the ETMS Ticket Processing Table, and retrieves a first ticket from the ETMS Ticket Processing Table for preprocessing. Once the TA Ticket Preprocessor has begun preprocessing of the first ticket, the first ticket becomes unavailable other processes. After preprocessing is completed on the first ticket, the state attribute associated with the first ticket is updated by the calling process (e.g., TA Ticket Preprocessor), and the first ticket again becomes available.

Next, at step 415, access to consume one record (e.g., row) in the ETMS Ticket Processing Table is requested by TA Ticket Initiator. In certain aspects, each ticket in the ETMS Ticket Processing Table will be associated with a record (row) in the ETMS Ticket Processing Table, thus, by granting access to a particular record in the ETMS Ticket Processing Table, access can be granted to a corresponding ticket that is ready for consumption (as indicated by one or more state attributes). Once the WLD grants access to the ETMS Ticket Processing Table, process 400 proceeds to step 420 in which the TA Ticket Initiator selects the next ticket (e.g., the first ticket discussed above) for further processing.

In certain aspects, a process (e.g., TA Ticket Initiator) may call upon a throttle (e.g., via a throttle API) to determine if a selected ticket can be processed on the host in which the calling process (TA Ticket Initiator) resides. This process is shown in step 425 in which the throttle is used to determine that the ticket selected by the TA Ticket Initiator can be processed. The determination as to whether or not to allow a particular ticket to be processed can be based on several types of information. For example, the throttle may base its determination on the hardware and/or software resources that are currently available on the host on which the calling process resides. Furthermore, the determination may be based on a computing cost associated with the ticket and/or an indication of priority associated with the ticket. If in step 425 it is determined by the throttle that the TA Ticket Initiator should not be allowed to process a particular ticket, the process 400 reverts back to step 420. However, if the TA Ticket Initiator is allowed to process the ticket, the process proceeds to step 430 in which processing is performed by the TA Ticket Initiator, and a state attribute of the ticket is updated in the ETMS Ticket Processing Table.

In step 435, it is determined if processing of the ticket is complete, for example using a post processing process, such as TA Ticket Postprocessor 240. If processing of the ticket is complete (e.g., as indicated by the state attribute of the corresponding to the ticket in the table) then the process proceeds to step 340, and the ticket is sent back to ETMS. Alternatively, if it is determined that processing of the ticket is not complete, the process proceeds to 445, and the ticket remains in the ETMS Ticket Processing table and is associated with a state attribute indicating the type of further processing that is required.

During the processing of heavier processing loads (e.g., due to a large influx of tickets, or influx of tickets associated with computationally intensive tasks) one or more hosts in the ticket processing system may become overloaded and thus temporarily unavailable. As noted above, under such circumstances, a process type (e.g., running on multiple different hosts) can indicate to the WLD that the processing load for that process type is exceptionally large, causing the WLD to enter a temporary "idle pause" mode to await the availability of more resources.

Additionally, certain processes that do not utilize the throttle, as discussed above, can also enter an "idle pause" mode and forego the processing of additional tickets of the associated task type. Although processes in the idle pause mode do not consume tickets, they can report their respective non-consumption of tickets to the WLD. The WLD may not be given a reason as to why a particular process failed to consume a ticket, for example, because there were no tickets to consume, or because the throttle prevented a process from consuming a ticket of a certain size. However, non-consumption indications for one or more processes of a certain type that are received by the WLD can cause the WLD to enter the idle pause mode with respect to the corresponding ticket or task type.

Although the WLD/throttle API of the subject technology can be used to expose the WLD and throttle to processes of a ticket management system, it is understood that the APIs may be called by other types of processes not discussed above. As such, the WLD API and throttle API described herein may be generalized for implementation in distributed processing systems not explicitly described herein.

A synopses for an example C++ programming implementation of an API of the subject technology is provided as the following:

```
int acquireWLDLock( const char *typeProcess, int lockTimeToLive,
int idlePauseTime, int iDebugLogLevelOn = 0/*false*/ );
int releaseWLDLock( const char *typeProcess, int consumed,
const char *comment, int iDebugLogLevelOn = 0/*false*/ );
int thresholdExceeded( const char *typeProcess, const char *parms[ ],
int iDebugLogLevelOn = 0/*false, 1=true*/, int iOuputOn = 1/*true,
0=false*/ );
```

Additionally, an example of the contents of a WLD configuration file (e.g., wld.config) is provided as follows:

```
DISTRIBUTORS="user1@host1:port1,
weight=10 user2@host2:port2,
weight=5 user3@host3:port3,weight=7"
``` where, all WLD's can have the same wld.config on every host. Each user@host can be a client to one local WLD process, for example, that is running in the same user@host account. In certain aspects, there can be multiple instances of a WLD running on the same host in separate user accounts, for example, each user account can have its own WLD process. In certain implementations, the environmental variable WLD_CONFIG_PATH can designate the location of the "wld.config" file. Furthermore, in come implementations, when a process calls acquireLock or releaseLock, those functions communicate (e.g., using the WLD API) with the local WLD process via a socket at a specific port number.

Furthermore, an example of the contents of a throttle configuration file (e.g., throttle.config) is provided as follows:

```
T=TktInit, P=WORKG=TKTMON*, P=TSP=*,
PID=cArtServer*=90,PID=cCircuitServer*=130,
%SWPOCC=75,%RUNOCC=75
T=TktInit, P=WORKG=PROACTIVE*, P=TSP=N,
PID=cArtServer*=100, PID=cCircuitServer*=150,
%SWPOCC=80,%RUNOCC=80
T=TktInit, P=WORKG=PROACTIVE*, P=TSP=Y,
PID=cArtServer*=110, PID=cCircuitServer*=160,
%SWPOCC=82,%RUNOCC=82
T=TktInit, P=WORKG=MNSO*, P=TSP=N,
PID=cArtServer*=125, PID=cCircuitServer*=210,
%SWPOCC=90,%RUNOCC=90
T=TktInit, P=WORKG=MNSO*, P=TSP=Y,
PID=cArtServer*=135, PID=cCircuitServer*=230,
%SWPOCC=92,%RUNOCC=92
T=TktInit, P=WORKG=*, P=TSP=N,
PID=cArtServer*=150, PID=cCircuitServer*=300,
%SWPOCC=95,%RUNOCC=95
T=TktInit, P=WORKG=*, P=TSP=Y,
PID=cArtServer*=160, PID=cCircuitServer*=300,
%SWPOCC=97,%RUNOCC=97
SARWindow=TktInit=300
```

The foregoing aspects of the subject technology provide a middleware WLD and throttle for use in distributing turn access to multiple processes that are executed on two or more computers (e.g., hosts). The number of executed processes may vary, depending on implementation, but in some aspects each of a plurality of computers can run multiple processes, wherein each process can be used to perform a specific type of task, for example, to process trouble tickets received from a communication network.

As discussed above, multiple tickets (or records) may be stored in a single table that is accessible by the multiple processes of the multiple computers. Each row of the table is associated with a unique ticket identification (e.g., a "ticket ID") corresponding with a ticket's entry in the table. Similarly, each row may be associated with several columns in the table, which can be used to store values related to the corresponding ticket's state attributes, e.g., the ticket's current state and/or progress in proceeding through the ticket processing system. As different processes process a ticket, the ticket's state attributes in the table are updated, for example, to indicate the type of processing that is further required, or to indicate processing that has been performed.

In certain implementations, each instance of any given process is capable of consuming (processing) a ticket (e.g., a record) of a corresponding task type, as indicated by a state attribute associated with the record. That is, a process configured to perform a specific processing task can select a ticket from the table that has a state attribute indicating that the ticket is in need of processing of a type that can be performed by the process.

Because the ticket processing system includes multiple running processes executed on each of multiple hosts, a way to avoid collisions between two processes of the same type is needed (e.g., collisions between two processes requesting access to the same ticket in the table). Thus, aspects of the subject technology implement a middleware WLD process to distribute and coordinate access to the table, for example, to ensure that different processes do not collide by attempting to consume a common ticket or record. Multiple instances of the WLD process can run simultaneously, for example, one instance of WLD will run on each of a plurality of hosts.

In certain aspects, each instance of the WLD is capable of communicating with all other instances of the WLD that are running on all other hosts. As explained above, each running instance of the WLD is made aware of all other running instances of the WLD (and the associated hosts) using a WLD configuration file (e.g., WLD.config), that contains the names of each host, as well as a weight designation based on an amount of available dedicated computing resources for that respective host. Although, multiple instances of WLD can be running at any moment, only one of those instances is responsible for granting access to the table. The WLD that assumes this responsibility is the "primary" or "king" WLD. In certain aspects, the WLD with the longest running "up" time is the WLD that is designated as "king."

In practice, each process that requires access to the ticket table will make the request to the instance of WLD running on the same (local) host. Interaction between the requesting process and the WLD is accomplished using an application programming interface (API), such as a WLD API, which exposes the functionality of the WLD to the requesting process. If the local WLD that receives the process happens to be the king WLD, then that instance of the WLD is responsible for granting turn-access to the process. However, if the local WLD is not the king WLD, then the access request will be transparently forwarded to the king WLD residing on another host.

In certain aspects, before a process will consume a ticket (or record) from the table, the process first consults a "throttle" that can be used to make a determination as to the current availability of dedicated computing resources on the host. Communication between the requesting process and the throttle occurs via an API, e.g., a throttle API that exposes the throttle functionality to the requesting process. In certain implementations, the throttle API will provide an interface between the calling process and host operating system (OS) on which the calling process is executed. As such, the throttle API may function as a client of the host OS.

The throttle can allow (or disallow) access by a process to a particular ticket depending on a number of criteria, including but not limited to, the amount of resources currently available to the host, the size of the processing ask associated with the ticket to be consumed, and/or an indication of priority for the ticket (for example, whether the ticket is associated with a high-priority customer, or whether the ticket is related to an emergency type problem, etc.).

Once a ticket has been fully processed, the state attribute of the ticket will be updated to reflect the completion of the processing, and the ticket can be returned to the program that issued the ticket for the circuit experiencing errors and/or malfunctions. For example, completed tickets can be selected by a TA Ticket Postprocessor process from the ticket table, and forwarded to ETMS before being returned to the program that issued the ticket for the circuit experiencing errors and/or malfunctions.

Figure 5:
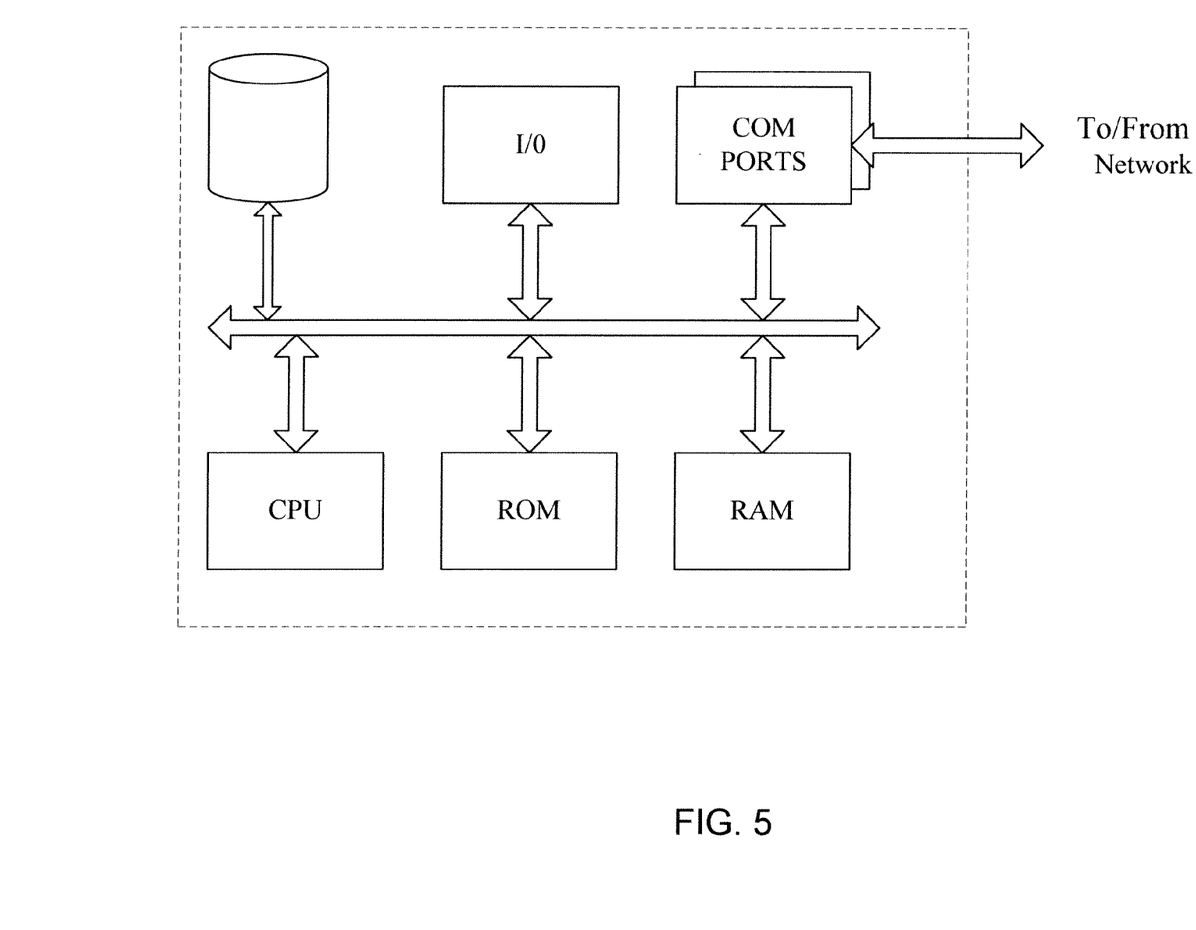
FIG. 5 is a simplified functional block diagram of a computer that may be configured as a host or server, for example, running one or more processes of the subject technology.
Figure 6:
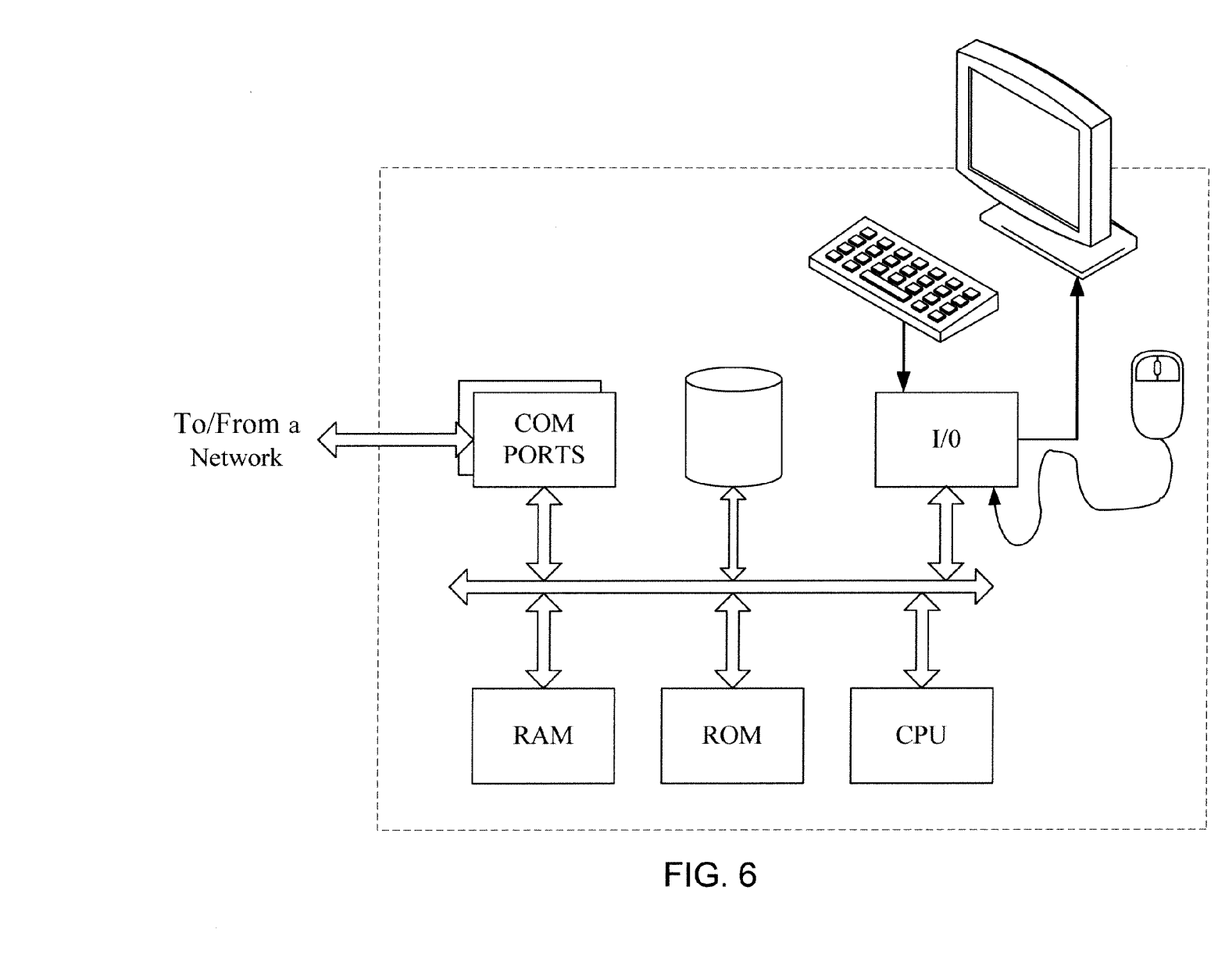
FIG. 6 is a block diagram illustrating a computer with user interface elements.

FIGS. 5 and 6 provide functional illustrations of general purpose computer hardware platforms. FIG. 5 is a block diagram illustrating a network or host computer, as may typically be used to implement a server, a controller, or a node. FIG. 6 is a block diagram illustrating a computer with user interface elements. In particular, FIG. 6 depicts a device with user interface elements, as may be used to implement a computer, a mobile device, or any other computing device. FIG. 6 can also be used to implement a host, such as a host used in a ticket processing system, as discussed above. A device like that of FIG. 6 may also act as a server, a controller, or a node if appropriately programmed. It is believed that the general structure and general operation of such equipment as shown in FIGS. 5 and 6 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, one or more such computer hardware platforms would run server programming, for example, to route data to their destination, function as a gateway, or record data for data usage billing purposes.

The server software functionalities involve programming, including executable code and possibly associated stored multimedia content data. The software code is executable by the central processing unit or other processor of the computer configured as the particular server. In operation, the code is stored within the server computer device. At other times, however, the software may be stored at other locations and/or transported for loading into the appropriate server computer or system. Execution of such code by a processor of the server computer enables the server to perform functions of to route data to their destination, function as a gateway, or record data for data usage billing purposes in essentially the manner performed in the implementations discussed and illustrated herein.

A user terminal such as a general-purpose personal computer or a mobile device typically includes a central processor or other processing device, an internal communication bus, various types of memory or storage multimedia (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the mobile device to establish an active traffic channel and communicate using the active traffic channel. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to establish an active traffic channel and communicate using the active traffic channel, in essentially the manner performed in the implementations discussed and illustrated herein.

Hence, aspects of the methods of the ticket processing system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks.

Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the ticket processing system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program aspects of the technology may be thought of as "products" or "articles of manufacture" typically in the form of executable code and/or associated data that is carried on or embodied in a type of non-transitory machine readable medium or in other media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one ticket or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:

receiving a stream of data records for tasks to be processed in a system comprising a plurality of computers, each data record associated with an error in a communication network and having a priority level;

storing the received data records in a table in at least one storage device of the system;

associating each data record in the table with a respective one of a plurality of task types;

executing multiple processes running on the one or more computers to implement tasks of the plurality of task types upon processing of the data records from the table;

receiving, from a single process from among the multiple processes, a request for turn access to the data records in the table; and determining to grant the request for turn access to the single process from among the multiple processes to retrieve one record from among the data records by:

accessing a throttle configuration file specifying a priority level threshold and a computing resource threshold for different types of processes, the throttle configuration file specific to a throttle instance that is running on a particular host computer;

identifying from the throttle configuration file that the priority level threshold of the single process is an emergency priority level and the computing resource threshold specific to the single process;

detecting, in real-time, available computing resources that are available to the particular host computer that the throttle instance and the single process is running on;

determining that the priority level of the one record is at the emergency priority level and satisfies the priority level of the single process and that the detected real-time available computing resources of the particular host computer exceeds the computing resource threshold of the single process;

in response to determining that the priority level of the one record is at the emergency priority level and satisfies the priority level of the single process and that the detected real-time available computing resources of the particular host computer exceeds the computing resource threshold of the single process, granting the request for turn access to the single process of the particular host computer from among the multiple processes; and in response to granting the request for turn access to the single process of the particular host computer from among the multiple processes, processing the one record associated with the error in the communication network on the particular host computer of the throttle instance via the single process.

2. The method of claim 1, further comprising:
granting the request for turn access to the single process;
updating a state attribute associated with the one record subsequent to completing the processing of the one record associated with the error in the communication network; and
storing the updated state attribute associated with the one record to the table.

3. The method of claim 1, wherein determining to grant turn access to the single process further comprises:
identifying a weight corresponding with a host associated with the single process; and
determining to grant turn access to the single process based on the weight.

4. The method of claim 1, wherein the available computing resources to the host comprise one or more of: processing power availability, memory availability and bandwidth availability.

5. The method of claim 1, wherein the determination to grant turn access to the single process from among the multiple processes is made by a first weighted load distributor from among a plurality of weighted load distributors, and wherein the first weighted load distributor is configured to perform operations for managing processing operations for one or more remaining weighted load distributors from among the plurality of weighted load distributors.

6. The method of claim 5, wherein, before determining to grant the request for turn access to the single process from among the multiple processes, the first weighted load distributor runs a weighted round robin procedure that selects the particular host computer by:
detecting real-time available computing resources of a plurality of host computers, including the particular host computer, at the time of the request for turn access to the data records in the table;
associating each of the plurality of host computers, including the particular host computer, with a weight corresponding to the detected real-time available computing resources of each host computer; and upon determining that the particular host computer of the single process has the highest weight, granting access to the one record to the one process of the particular host computer.

7. The method of claim 6, wherein each of the plurality of host computers includes an identical weighted load distributor configuration file including all other host computers and associated weights corresponding to the detected real-time available computing resources of each host computer.

8. A system for processing a stream of data records, the system comprising:
a plurality of computers, wherein each of the plurality of computers comprises one or more processors and a computer readable medium having instructions stored therein, which when executed by the one or more processors, cause the one or more processors to perform operations comprising:
receiving, at one or more of the plurality computers, a stream of data records for tasks to be processed by the one or more processors, each data record associated with an error in a communication network and having a priority level;
storing the received data records in a table in at least one storage device of the system;
associating each data record in the table with a respective one of a plurality of task types;
executing multiple processes running on the one or more computers to implement tasks of the plurality of task types upon processing of the data records from the table;
receiving, from a single process from among the multiple processes, a request for turn access to the data records in the table; and
determining to grant the request for turn access to the single process from among the multiple processes to retrieve one record from among the data records by:
accessing a throttle configuration file specifying a priority level threshold and a computing resource threshold for different types of processes, the throttle configuration file specific to a throttle instance that is running on a particular host computer;
identifying from the throttle configuration file that the priority level threshold of the single process is an emergency priority level and the computing resource threshold specific to the single process;
detecting, in real-time, available computing resources that are available to the particular host computer that the throttle instance and the single process is running on; and
determining that the priority level of the one record is at the emergency priority level and satisfies the priority level of the single process and that the detected real-time available computing resources of the particular host computer exceeds the computing resource threshold of the single process;
in response to determining that the priority level of the one record is at the emergency priority level and satisfies the priority level of the single process and that the detected real-time available computing resources of the particular host computer exceeds the computing resource threshold of the single process, granting the request for turn access to the single process of the particular host computer from among the multiple processes; and
in response to granting the request for turn access to the single process of the particular host computer from among the multiple processes, processing the one record associated with the error in the communication network on the particular host computer of the throttle instance via the single process.

9. The system of claim 8, wherein the processors are further configured to perform operations for:
   granting the request for turn access to the single process;
   updating a state attribute associated with the one record subsequent to completing the processing of the one record associated with the error in the communication network; and
   storing the updated state attribute associated with the one record to the table.

10. The system of claim 8, wherein determining whether to grant turn access to the single process further comprises:
    identifying a weight corresponding with a host associated with the single process; and
    determining to grant turn access to the single process based on the weight.

11. The system of claim 8, wherein the available computing resources comprise one or more of: processing power availability, memory availability and bandwidth availability.

12. The system of claim 8, wherein the determination to grant turn access to the single process from among the multiple processes is made by a first weighted load distributor from among a plurality of weighted load distributors, and
    wherein the first weighted load distributor is configured to perform operations for managing processing operations for one or more remaining weighted load distributors from among the plurality of weighted load distributors.

13. The system of claim 12, wherein, before determining to grant the request for turn access to the single process from among the multiple processes, the first weighted load distributor runs a weighted round robin procedure that selects the particular host computer by:
    detecting real-time available computing resources of a plurality of host computers, including the particular host computer, at the time of the request for turn access to the data records in the table;
    associating each of the plurality of host computers, including the particular host computer, with a weight corresponding to the detected real-time available computing resources of each host computer; and
    upon determining that the particular host computer of the single process has the highest weight, granting access to the one record to the one process of the particular host computer.

14. A non-transitory computer-readable storage medium comprising instructions stored therein, which when executed by a processor, cause the processor to perform operations comprising:
    receiving a stream of data records for tasks to be processed in a system comprising a plurality of computers, each data record associated with an error in a communication network and having a priority level;
    storing the received data records in a table in at least one storage device of the system;
    associating each data record in the table with a respective one of a plurality of task types;
    executing multiple processes running on the one or more computers to implement tasks of the plurality of task types upon processing of the data records from the table;
    receiving, from a single process from among the multiple processes, a request for turn access to the data records in the table; and
    determining to grant the request for turn access to the single process from among the multiple processes to retrieve one record from among the data records by:
       accessing a throttle configuration file specifying a priority level threshold and a computing resource threshold for different types of processes, the throttle configuration file specific to a throttle instance that is running on a particular host computer;
       identifying from the throttle configuration file that the priority level threshold of the single process is an emergency priority level and the computing resource threshold specific to the single process;
       detecting, in real-time, available computing resources that are available to the particular host computer that the throttle instance and the single process is running on; and
       determining that the priority level of the one record is at the emergency priority level and satisfies the priority level of the single process and that the detected real-time available computing resources of the particular host computer exceeds the computing resource threshold of the single process;
    in response to determining that the priority level of the one record is at the emergency priority level and satisfies the priority level of the single process and that the detected real-time available computing resources of the particular host computer exceeds the computing resource threshold of the single process, granting the request for turn access to the single process of the particular host computer from among the multiple processes; and
    in response to granting the request for turn access to the single process of the particular host computer from among the multiple processes, processing the one record associated with the error in the communication network on the particular host computer of the throttle instance via the single process.

15. The non-transitory computer-readable storage medium of claim 14, wherein the processor is further configured to perform operations comprising:
    granting the request for turn access to the single process;
    updating a state attribute associated with the one record subsequent to completing the processing of the one record associated with the error in the communication network; and
    storing the updated state attribute associated with the one record to the table.

16. The non-transitory computer-readable storage medium of claim 14, wherein determining to grant turn access to the single process further comprises:
    identifying a weight corresponding with a host associated with the single process; and
    determining to grant turn access to the single process based on the weight.

17. The non-transitory computer-readable storage medium of claim 14, wherein the available computing resources comprise one or more of: processing power availability, memory availability and bandwidth availability.

18. The non-transitory computer-readable storage medium of claim 14, wherein the determination to grant turn access to the single process from among the multiple processes is made by a first weighted load distributor from among a plurality of weighted load distributors, and
    wherein the first weighted load distributor is configured to perform operations for managing processing operations for one or more remaining weighted load distributors from among the plurality of weighted load distributors.

19. The non-transitory of claim 18, wherein each of the plurality of host computers includes an identical weighted load distributor configuration file including all other host computers and associated weights corresponding to the detected real-time available computing resources of each host computer.

20. The non-transitory computer-readable storage medium of claim 18, wherein, before determining to grant the request for turn access to the single process from among the multiple processes, the first weighted load distributor runs a weighted round robin procedure that selects the particular host computer by:
- detecting real-time available computing resources of a plurality of host computers, including the particular host computer, at the time of the request for turn access to the data records in the table;
- associating each of the plurality of host computers, including the particular host computer, with a weight corresponding to the detected real-time available computing resources of each host computer; and
- upon determining that the particular host computer of the single process has the highest weight, granting access to the one record to the one process of the particular host computer.

21. The non-transitory computer-readable storage medium of claim 20, wherein each of the plurality of host computers includes an identical weighted load distributor configuration file including all other host computers and associated weights corresponding to the detected real-time available computing resources of each host computer.

* * * * *